United States Patent [19]

Ryason

[11] 4,105,517
[45] Aug. 8, 1978

[54] SOLAR PHOTOLYSIS OF WATER

[76] Inventors: Robert A. Frosch, Administrator of the National Aeronautics and Space Administration, with respect to an invention of Porter R. Ryason, La Canada, Calif.

[21] Appl. No.: 838,336

[22] Filed: Sep. 30, 1977

[51] Int. Cl.² ............................................. B01J 1/10
[52] U.S. Cl. .............................. 204/157.1 R; 250/527
[58] Field of Search ................................. 204/157.1 R

[56] References Cited

U.S. PATENT DOCUMENTS 4,045,315  8/1977  Ryason ........................ 204/157.1 R

OTHER PUBLICATIONS

C & E News, Aug. 1, 1977, pp. 15 & 16.

*Primary Examiner*—Howard S. Williams
*Attorney, Agent, or Firm*—Monte F. Mott; John R. Manning; Wilfred Grifka

[57] ABSTRACT

A cyclic process for the solar photolysis of water includes a first stage in which water is reduced in the presence of a $Eu^{+2}$ photo-oxidizable reagent producing hydrogen and spent oxidized $Eu^{+3}$ reagent. The spent reagent ($Eu^{+3}$) is reduced by means of a transition metal ligand complex reductant, $*RuL^{+3}$ in a photoexcited state, such as a ruthenium pyridyl complex. Due to competing reactions between the photolysis and regeneration products, the photo-oxidation reaction must be separated from the regeneration in space and time by supporting the reagent and/or the reductant on solid supports and utilizing pH, wavelength and flow control to maximize hydrogen and oxygen production.

15 Claims, 3 Drawing Figures

SOLAR PHOTOLYSIS OF WATER

ORIGIN OF THE INVENTION

The invention described herein was made in the performance of work under a NASA contract and is subject to the provisions of Section 305 of the National Aeronautics and Space Act of 1958, Public Law 83–568 (72 Stat. 435; 42 USC 2457).

BACKGROUND OF THE INVENTION

1. Field of the Invention

The present invention relates to solar photolysis of water to produce pure hydrogen and to various methods and apparatus for conducting such a process.

2. Description of the Prior Art

Self-sufficiency in energy is a stated national goal.

Most of the proposed means to achieve this goal are either environmentally unacceptable or are not feasible, especially those not depending on fossil fuel sources. Of the available alternatives, solar energy is the most abundant, inexhaustable single resource available. However, capturing and utilizing solar energy is not simple. Methods are being sought to convert solar energy to a concentrated, storable form of energy. A known method, photosynthesis, converts somewhat less than 1% of the sun's energy at the earth's surface to a solid fuel, i.e., plant materials, which when accumulated and transformed over geologic ages yielded fossil fuels. Current rates of use of these fossil fuels, and the particular geographic distribution and political control of major petroleum resources pose problems for nations that are net petroleum consumers. An alternate method yielding a simpler fuel, at a higher conversion, has long been desired.

Production of hydrogen by the solar photolysis of water would be an extremely desirable fuel, since it would be prepared in high purity, and the combustion product of hydrogen is water which is totally environmentally acceptable. However, it is widely believed that solar photolysis of water is not feasible, especially at quantum efficiency exceeding 1%. Douglas and Yost noted twenty four years ago in J. Chem. Phys. 17, 1345 (1949) and J. Chem. Phys. 18, 1687 (1950) that hydrogen was produced during photolysis of europium (II) solutions. Yields of hydrogen were not measured since their main interest was in europium oxidation. This sole reaction would not lead to a feasible process for photolyzing water since the europium ion would be continuously exhausted by stoichiometric reaction with water, therefore the process would be unduly expensive since the amount of hydrogen generated would not economically justify the cost of the europium reagent.

A cyclic photo-redox process having water and sunlight as reactants and hydrogen and oxygen and products has been disclosed in a patent application Ser. No. 658,132 filed Feb. 13, 1976, now issued on Aug. 30, 1977 as U.S. Pat. No. 4,045,315. That process utilized a soluble divalent europium photo-oxidation reagent in the hydrogen generation cycle and a complex series of steps in the dark in which a water-stable manganese oxychloride is utilized to regenerate the spent trivalent europium photo-oxidation reagent. The complexity renders the process less economic in the large scale harvesting of solar energy and the dark reaction requires use of dark panels or waiting for sunset to conduct the regeneration cycle of the process.

SUMMARY OF THE INVENTION

An improved process for the solar photolysis of water is provided in accordance with this invention. The process utilizes a photogenerated reductant capable of activation by ground level solar radiation during sunlight hours obviating the need to apply cover panels to the photoreduction reactor or to await dark periods for regeneration of the photo-oxidant reagent. The process of the invention produces improved yields of hydrogen and oxygen. The photoreductant is a single compound which reduces complexity and improves economics of the process.

The solar photolysis process of the invention utilizes transition metal ligand complexes in a photoexcited state for the reduction and regeneration of the spent photo-oxidant reagent. At least one of the photo-oxidant and the photo-reductant reagents are supported on an inert, particulate support. It is known that the complexes of transitions metals such as ruthenium with ligands such as bipyridine compounds in the photoexcited state can reduce trivalent europium and other ions. There has been no successful implementation of the reaction due to the well known competing reactions between the trivalent ruthenium ligand metal complex and the divalent europium compounds summarized as follows:

FORMATION REACTION

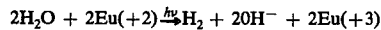
$$2H_2O + 2Eu(+2) \xrightarrow{h\nu} H_2 + 2OH^- + 2Eu(+3)$$

REGENERATION REACTION

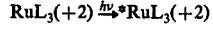
$$RuL_3(+2) \xrightarrow{h\nu} {}^*RuL_3(+2)$$

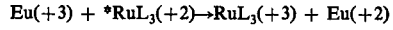
$$Eu(+3) + {}^*RuL_3(+2) \rightarrow RuL_3(+3) + Eu(+2)$$

UNDESIRABLE SIDE REACTION OF RECYCLABLE PRODUCT

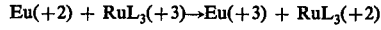
$$Eu(+2) + RuL_3(+3) \rightarrow Eu(+3) + RuL_3(+2)$$

UNDESIRABLE REACTION BETWEEN METAL COMPLEX AND WATER

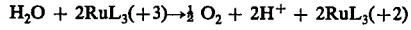
$$H_2O + 2RuL_3(+3) \rightarrow \tfrac{1}{2}O_2 + 2H^+ + 2RuL_3(+2)$$

UNDESIRABLE REACTION ONCE OXYGEN IS FORMED

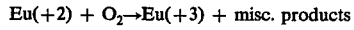
$$Eu(+2) + O_2 \rightarrow Eu(+3) + \text{misc. products}$$

The present invention conducts the regeneration reaction in a mode which prevents the two regeneration products from interacting undesirably and also prevents undesirable side reactions between either one of the regeneration products and other materials present such as water or oxygen. A simple batch regeneration process cannot and will not produce any significant recyclable amounts of regenerated photo-oxidant. In the present invention the efficiency of the regeneration reaction is promoted by separating in time and space the regeneration reaction from the photo-oxidation reaction and by use of flow systems, pH and wavelength control to separate the products of the photoexcited reductant reaction and the photo-oxidation reaction. The invention utilizes a particulate metal oxide support for either the photo-oxidant reagent, the photo-reductant reagent or both and may also utilize a hydrogen recombination catalyst in the photo-oxidation reaction reactor.

These and many other features and attendant advantages of the invention will become apparent as the invention becomes better understood by reference to the following detailed description when considered in conjunction with the accompanying drawings.

DESCRIPTION OF THE PREFERRED EMBODIMENTS

Figure 1:
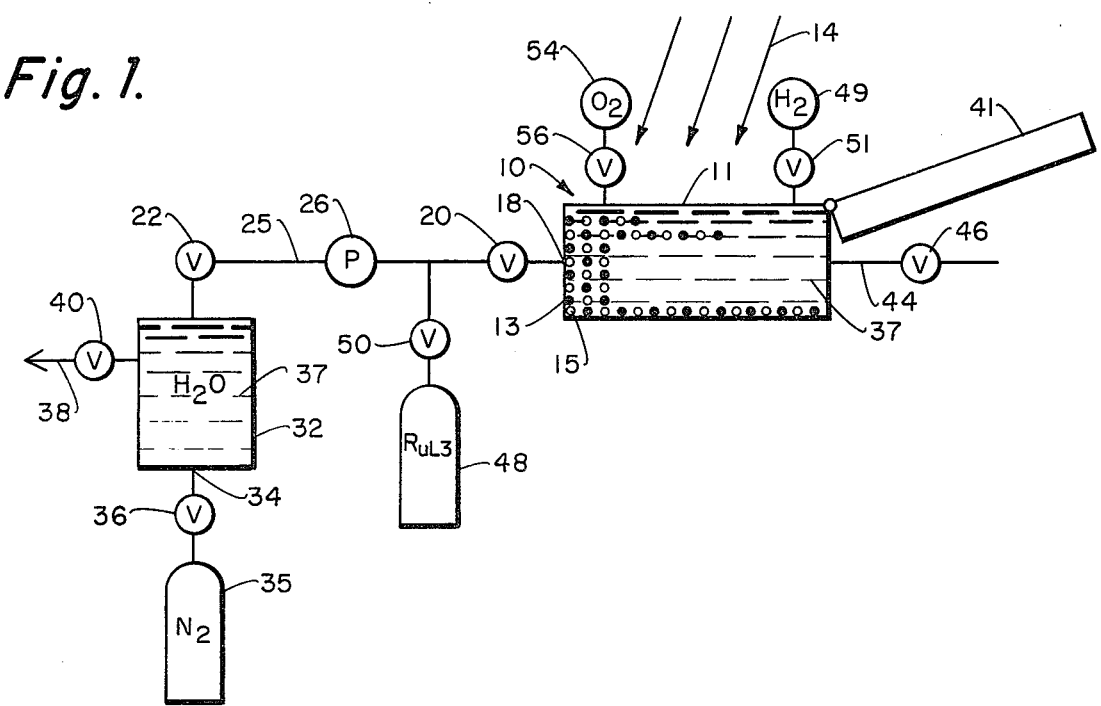
FIG. 1 is a schematic view of a first embodiment of the invention.

The photo-oxidant reagent is a material which absorbs strongly in the solar range at ground level and in its excited state is capable of reducing water to produce hydrogen with a quantum efficiency exceeding 0.1%. Quantum efficiency is defined as the number of moles of hydrogen produced per mole of light absorbed. Suitable water soluble transition metal cations capable of such efficiency are, for example, $Eu^{++}$, $Cr^{++}$, $V^{++}$ and $Ti^{++}$ of which $Eu^{++}$ is preferred. The pH of solution is no greater than 5 and the preferred range being 4–5. A high concentration of from 0.5 to 5 M of any of the anions, $Cl^-$, $SO_4^{--}$, or $PO_4^{--}$, is maintained by dissolving appropriate amounts of alkali metal salts of these anions in the photo-oxidation solution. Sodium chloride is the preferred anion source.

A heterogeneous hydrogen recombination catalyst is preferably immobilized in the photo-oxidation reactor. The catalyst is preferably in the form of non-porous beads or fibers on which is deposited by means well known to the art, highly dispersed metals such as Pt, Rh, Pd, Ir, Os, or Ni. The surface of the glass beads or fibers may be in the form received from normal manufacture or may be altered by initially etching the surface with dilute HF solution and then depositing on it by means well known to those skilled in the art, hydrogels of silica, alumina or selected combinations of these. The preferred combination is Pt on a glass surface treated with an alumina hydrogel so that the effective catalyst is platinum on an alumina surface. Obviously, hydrous aluminum in the form of beads or fibers may also be used instead of glass beads. However, it is important to note that the bead of fiber substrate must not be microporous; only the very surface (less than a 10 nm layer) may be a microporous layer having a high area. The metal concentration may be in the range of 0.5–0.05% by weight; the preferred range is 0.05–0.10% by weight.

The size of the beads or the porosity of the fiber mat is governed by the acid concentration. If the pH is 4, then the maximum of spacing between surfaces may not exceed 1.0 nm. Smaller spacing may be used and will occur in a bed of beads or a glass mat, but excessively small spacing will result in a long drainage time of the solution when it is transferred to the reductant after exposure to sunlight. Hence the spacing (e.g., bead size) will be selected to meet the above specification and yet have the bed drain in a reasonable time; that time being determined by reactor size in a manner well known to chemical engineering art.

An extended photoactive range may be obtained by the use of a photochromic glass, in which the composition of the beads or fiber is altered (at the time of manufacture) to make the glass photochromic. Additions of silver halides, copper halides, iron (ferric) halides, will provide glasses with photochromic properties.

In certain embodiments of the invention the europium photo-oxidation reagent is supported on particular inert metal oxide supports having pendant oxygen functional groups capable of associating with and binding the europium ion to the support during both the photo-oxidation reaction and during the reduction regeneration process. The amount of europium ion deposited on the support is determined by the quantum efficiency of the photo-oxidant.

Hydrogen production proceeds in the photo-oxidation reaction according to the following general reaction scheme:

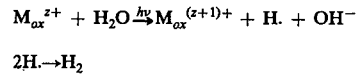

$$2H. \rightarrow H_2$$

where z is the valence of the photo-oxidation reagent, $M_{ox}$. Pure hydrogen separates from the solution as a gas. The oxidized cation $M_{ox}^{(z+1)+}$ must be regenerated by reduction.

The photogenerated reductant utilized in the present invention is a luminescent excited state of $*RuL_3$ where L is a ligand such as a derivative of bipyridine or phenanthroline. Quenching of the emissions of polypyridineruthenium II complexes have been investigated by C. T. Lin et al (Jacs, 98:21 Oct. 1976) to determine the electron and energy transfer mechanisms. The complexes exhibit maximum absorbance around 450 nm and maximum emission around 600 nm and emission lifetimes of 0.001 to 5 microseconds. The absorption and emission spectra of representative complexes in water at 25° C is provided in the following table:

TABLE I

Charge-Transfer of Absorption and Emission Spectra and Emission Lifetimes ($\tau_0$) of Polypyridineruthenium (II) Complexes in Water at 25° C

| Complex | Absorption λmax. nm | $10^{-4}\epsilon$ $M^{-1}cm^{-1}$ | Emission λmax. nm Uncorr[a] | Corr | $\tau_0$ $\mu s^c$ |
|---|---|---|---|---|---|
| $Ru[4,4'-(CH_3)_2bpy]_3[ClO_4]_2 \cdot 3H_2O$ | (~430)[b]460 | 1.43 | 628 | 633 | 0.33±0.01 |
| $Ru[4,4'-(C_6H_5)_2bpy]_3Cl_2 \cdot 6H_2O$ | (~445)[b]474 | 3.27 | 632 | 638(653)[b] | 0.67±0.03 |
| $Ru[bpy]_3Cl_2 \cdot 6H_2O$ | (~423)[b]452 | 1.46 | 607 | 613,627 | 0.60±0.02 |
| $Ru[3,4,7,8-(CH_3)_4phen]_3Cl_2 \cdot 6H_2O$ | 438 | 2.45 | 597 | 605,625 | 1.39±0.10 |
| $Ru[3,5,6,8-(CH_3)_4phen_3][ClO_4]_2 \cdot 2H_2O$ | 417,440 | 1.96,1.98 | 594 | 605,625 | 2.22±0.10[d] |
| $Ru[4,7-(CH_3)_2phen]_3Cl_2 \cdot 6H_2O$ | 425,445 | 2.53,2.53 | 607 | 613,626 | 1.74±0.04 |
| $Ru[5,6-(CH_3)_2phen]_3Cl_2 \cdot 6H_2O$ | 425,453 | 1.84,2.04 | 602 | 608,625 | 1.81±0.05 |
| $Ru[4,7-(C_6H_5)_2phen]_3Cl_2 \cdot 3H_2)$ | 460 | 2.95 | 610 | 613,625 | 4.68±0.19 |
| $Ru[5-(CH_3)phen]_3Cl_2 \cdot 6H_2O$ | 420,450 | 1.79,1.94 | 597 | 605,625 | 1.33±0.03 |
| $Ru[5-(C_6H_5)phen]_3Cl_2 \cdot 5H_2O$ | 420,448 | 2.32,2.46 | 595 | 605,625 | 1.29±0.02 |
| $Ru[phen]_3[ClO_4]_2 \cdot 3H_2O$ | 421,447 | 1.83,1.90 | 593 | 605,625 | 0.92±0.10 |
| $Ru[5-Cl(phen)]_3[ClO_4]_2 \cdot 3H_2O$ | 422,447 | 1.78,1.84 | 593 | 605,625 | 0.94±0.03 |

TABLE I-continued

Charge-Transfer of Absorption and Emission Spectra and Emission Lifetimes ($\tau_0$)
of Polypyridineruthenium (II) Complexes in Water at 25° C

| Complex | Absorption | | Emission | | $\tau_0$ |
|---|---|---|---|---|---|
| | $\lambda$max. nm | $10^{-4}\epsilon$ $M^{-1}cm^{-1}$ | $\lambda$max. nm Uncorr[a] | Corr | $\mu s^c$ |
| Ru[5-Br(phen)]$_3$Cl$_2$ . 5H$_2$O | 420,448 | 1.82,1.88 | 593 | 605,625 | 1.04±0.02 |
| Ru[5-NO$_2$phen]$_3$I$_2$ . 3H$_2$O | 449 | 2.0 | ~595 | ~606 | ≦5 × 10$^{-3}$ |
| Ru[terpy]$_2$[ClO$_4$]$_2$ . 3H$_2$O | 473 | 1.62 | ~610 | ~628 | ≦5 × 10$^{-3}$ |
| Ru[TPTZ]$_2$[ClO$_4$]$_2$ . 3H$_2$O | 501 | 1.92 | ~600 | ~605 | ≦5 × 10$^{-3}$ |

[a] These maxima refer to values obtained in the "ratio mode". The quenching measurements were generally made at the emission maximum in the "energy mode".
[b] Shoulder.
[c] Average of five-six determinations with standard deviation.
[d] Emission lifetime is 2.08±0.10 $\mu s$ in 0.5 M sulfuric acid.

The 4,7—(CH$_3$)$_2$phen, 5,6—(CH$_3$)$_2$phen, 5—(CH$_3$)phen complexes show appreciable reaction with europium (III). The emission lifetimes are greatly increased by the introduction of phenyl groups in the 4,7 positions of the phenanthroline ring system. However, the lifetimes do not otherwise appear to be especially sensitive to substitution in the 4,7 positions, since the lifetimes of the 4,7 and 5,6 dimethyl derivatives are comparable. Also of interest is the result that introduction of a methyl group in the 4,4'positions of bipyridine decreases the emission lifetime of the complex, whereas the lifetime of the phenanthroline complex is increased by methyl substitution. By contrast, the emission lifetime of the bipyridine and the phenanthroline complexes are both increased by phenyl substitution.

A first embodiment of the invention utilizes a supported Europium(III)photo-oxidant reagent and a soluble photo-reductant regeneration reagent.

Referring now to FIG. 1, the photolytic hydrogen production system includes a photo-oxidation reactor 10 having a face 11 directed towards and transparent to solar radiation 14. The transparent panels utilized in the reactor must be transparent to the full ground level solar range, i.e. down to 290 nm. Suitable materials are fused silica, sapphire (Al$_2$O$_3$), Vycor (high silica glass) and Pyrex (borosilicate glass), the latter being preferred.

The reactor 10 includes particulate photo-oxidation reagent 13 Eu(II) deposited on an alumina support and hydrogen recombination catalyst particles 15 in bead or fibrous form.

The reactor has an inlet, 18, connected to a manifold 25 containing a pump 26 and valve 20. The manifold 25 also connects through valve 22 to the outlet 20 to water supply tank 32. The process of the invention requires ultra pure water. The water may be purified by repeated distillation, reverse osmosis or ion exchange and filtering on activated carbon. Furthermore, the solution in the photo-oxidation reactor 10 must be free of oxygen. Gases may be eliminated from the water supply by means of a vacuum pump or by purging with an inert gas, suitably nitrogen, for example, by introducing nitrogen under pressure from tank 35 into inlet 34 when valve 36 is open and purging through vent 38 when valve 40 is open.

The pure, nitrogen purged water 37 is introduced into reactor 10, by opening valves 20 and 22, and by activating pump 26. Valve 22 is then closed.

Irradiation of the water in reactor with light at a wavelength of $\lambda < 400$nm, in presence of supported photo-oxidant reagent, Eu(+2) and recombination catalyst results in production of hydrogen according to the following reaction:

$$2H_2O + 2Eu(+2) \xrightarrow{\lambda \leq 400nm} 2Eu(+3) + H_2 + OH^-$$

Hydrogen is collected in vessel 49 with valve 51 open. Upon completion of the hydrogen production cycle, the supported reagent is in the Eu(+3) state. A filter cover 41 passing light of $\lambda > 450$nm is disposed between the face 11 and the source 14 of incident solar radiation. The spent solution is drained from vessel 10 through outlet 44 by opening valve 46. A solution 48 of ruthenium trispyridyl chloride is then flowed over the supported Eu(+3) by means of pump 26 when valves 20 and 50 are open. The following three reactions occur.

$$RuL_3(+2) \xrightarrow{h\nu \lambda > 450nm} {}^*RuL_3(+2)$$

$$Eu(+3) + {}^*RuL_3(+2) \rightarrow Eu(+2) + RuL_3(+3)$$

$$H_2O + 2RuL_3(+3) \rightarrow 2H(+) + \tfrac{1}{2}O_2 + 2RuL_3(+2)$$

The solution of reductant must remain flowing through the vessel 10 until complete regeneration to Eu(+2) has occurred since the oxygen produced would react with the regenerated Eu(+2). Oxygen can be recovered in recovery vessel 54 when valve 56 is open. Furthermore, due to the very short lifetime of about 0.85 microseconds of *RuL$_3$(+2), surfaces of the particulate Eu(+3) must be close together (at least about 64nm). The required rapid flow to remove RuL$_3$(+3) along with possible oxygen from the vicinity of the Eu(+2) can be provided by any conventional means, with attention to minimizing turbulence. However it may develop that certain highly turbulent systems involving high pressure drop may also be employed.

After complete regeneration, the reductant solution 48 is removed through outlet 44 and valve 46 closed. Valve 50 is closed, valve 22 opened and fresh water reintroduced into vessel 10. When filter panel 41 is removed, hydrogen production by photolysis again proceeds.

Figure 2:
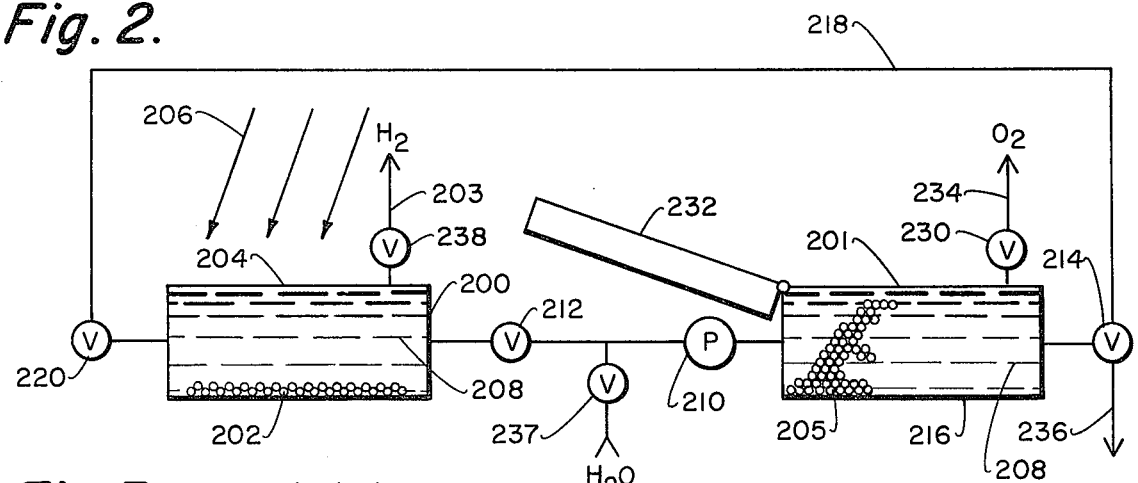
FIG. 2 is a schematic view of a second embodiment of the invention.

The system of FIG. 2 utilizes a supported photogenerated reductant and a soluble photo-oxidant. The system includes a photo-oxidation reactor vessel 200 and a reductant column 201. The vessel 200 contains hydrogen recombination catalyst particles 202. The reactor 200 has a panel 204 transparent to incident radiation 206 at a wavelength of <400nm. The column 201 contains particulate supported reductant RuL$_3$ 205 such as the 4,4'-dicarboxy derivative of bipyridine bonded to the surface of alumina particles. The —COOH carboxy, and —N= tertiary amine groups are both capable of associating, complexing or chelating with the alumina particles to form bonds capable of surviving the conditions of the process.

The process is initiated with a dilute Eu(+2) solution 208 present in the vessel 200. Hydrogen is liberated when incident solar radiation 206 photolyzes the water according to the following reaction:

$$2Eu(+2) + 2H_2O \xrightarrow{h\nu \lambda < 400nm} 2Eu(+3) + H_2 + 2OH^-$$

Generated hydrogen is collected at outlet 203.

The strongly acidic spent solution 208 is then pumped by means of pump 210 into column 201 with valve 212 open and valve 214 closed. The walls 216 of the column 201 are either covered with a +450nm band pass filter or the walls are fabricated from a material passing the desired wavelengths. The incident solar radiation 206 will generate reductant according to the following reaction:

$$RuL_3(+2) \xrightarrow{h\nu \lambda > 450nm} {}^*RuL_3(+2)$$

As the spent solution 208 flows over the reductant regeneration occurs as follows:

$$Eu(+3) + {}^*RuL_3(+2) \rightarrow RuL_3(+3) + Eu(+2)$$

Oxygen is evolved very slowly by $RuL_3(+3)$ from strongly acidic solutions. Therefore by slowly flowing the solution through the column 201, regenerated $Eu(+2)$ can be conducted away from the fixed $RuL_3(+3)$. By utilizing a sufficiently lengthy column, substantially all of the $Eu(+3)$ is regenerated. No lifetime limitation exists as to $Eu(+2)$ and hence, spacing of the surfaces of the $RuL_3$ particles can be adjusted to provide an adequate flow rate at low pressure differentials. The regenerated photoxidant solution is recycled to reactor 200 through line 218 with valve 214 closed and valve 220 open.

The cycle is completed by a dark reaction to regenerate the $RuL_3(+3)$ and to generate oxygen. After recycle of the regenerated solution, valve 214 is closed, valve 237 is opened and water at pH 7 is pumped into column 201. A dark cover 232 is placed over the column. The following reaction proceeds.

$$H_2O + 2RuL_3(+3) \xrightarrow{dark} 2RuL_3(+2) + 2H^+ + \tfrac{1}{2} O_2$$

Oxygen is collected at 234. After complete regeneration the wash water is drained with valve 214 directed toward outlet 236.

In a further embodiment of the invention both the $Eu(+3)$ photo-oxidant and ${}^*RuL_3(+2)$ photo-reductant are bonded to the surface of a support such as particulate alumina. Control of the pH of the aqueous media is utilized to separate the production of hydrogen and oxygen according to the following reactions.

Reductant Activation $$RuL_3(+2) \xrightarrow{pH \leq 5} {}^*RuL_3(+2)$$

Hydrogen Formation $${}^*RuL_3(+2) + Eu(+3) \xrightarrow{pH \leq 5} RuL_3(+3) + Eu(+2)$$

$$2Eu(+2) + 2H_2O \xrightarrow{pH \leq 5} 2Eu(+3) + H_2 + OH^-$$

The above-recited irradiation steps utilize light in the wavelength range of about 290 to 550 nm.

Regeneration Step $$H_2O + RuL_3(+3) \xrightarrow[pH = 7]{dark\ reaction} 2RuL_3(+2) + 2H^+ + \tfrac{1}{2}O_2$$

Figure 3:
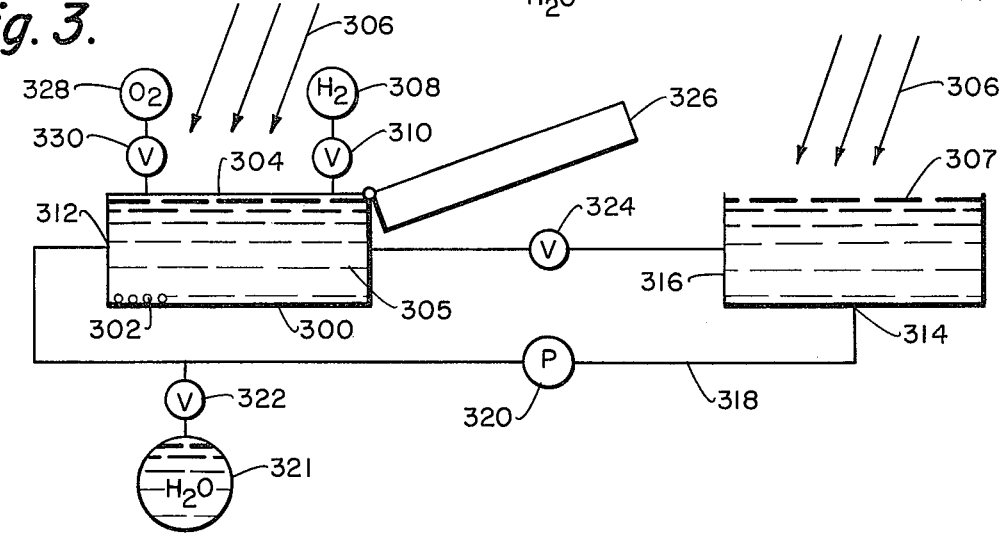
FIG. 3 is a schematic view of a third embodiment of the invention.

Referring now to FIG. 3 the solar photolysis reactor 300 contains particles 302 on which is supported $Eu(+3)$ ions and $RuL_3(+2)$ ions. The reactor 300 has a face 304 directed toward and transparent to solar radiation 306 in a wavelength band of from 290 to 550 nm.

When water 305 at low pH, suitably from 4 to 5, is pumped into reactor 300, the water is photolyzed to produce hydrogen recovered in vessel 308 when valve 310 is open while oxygen production is supported.

The low pH water can be made up by adding an acid to the feed delivered to inlet 312 or the water leaving outlet 314 can be concentrated by evaporation, suitably in solar evaporator 316 before being recycled to reactor inlet 312 by recycle line 318 containing pump 320.

During hydrogen production, the photogenated reductant will regenerate $Eu(+3)$ to $Eu(+2)$ until all of the reductant is oxidized to $RuL_3(+3)$.

At this stage, all of the media 307 is pumped into evaporation tank 316, water at pH 7 is pumped from supply 321 with valve 322 open and valve 324 closed and dark panel 326 is rotated over face 304. The regeneration step proceeds in the dark to production of oxygen which collects in vessel 328 when valve 330 is open.

Judicious pH control during the pH 5 -stages of the above process serves to minimize or prevent direct reduction of the supported $RuL_3(+3)$ by hydrogen as H or $H_2+$, which represents a possible side reaction during regeneration-formation steps.

It is to be realized that only preferred embodiments of the invention have been described and that numerous substitutions, modifications and alterations are permissible without departing from the spirit and scope of the invention as defined in the following claims:

What is claimed is:

1. A method of photolyzing water comprising the steps of:
    applying solar radiation to water in the presence of a photo-oxidizable reagent material which absorbs strongly in the solar range at ground level and is capable of photolyzing water to produce hydrogen with a quantum efficiency exceeding 0.1% and generating hydrogen while forming spent reagent;
    contacting the spent reagent with a transition metal ligand complex regenerated in a photoexcited state to reduce and regenerate the reagent;
    supporting the reagent or the regenerant on a solid support and dissolving the regenerant or the reagent in water; and
    flowing the solution past the solid support during regeneration.

2. A method according to claim 1 in which the support is particulate.

3. A method according to claim 2 in which the support is a metal oxide.

4. A method according to claim 3 in which the support is alumina.

5. A method according to claim 1 in which the photolysis products contact an insoluble, hydrogen recombination catalyst immobilized on a support.

6. A method according to claim 5 in which the recombination catalyst is selected from Pt, Rh, Pd, Ir, Os and Ni.

7. A method according to claim 6 in which the metal concentration of the recombination catalyst is 0.5 to 0.005% by weight.

8. A method according to claim 1 in which the reagent is a transition metal cation selected from $Eu^{++}$, $Cr^{++}$, $V^{++}$ and $Ti^{++}$ and the pH of the solution is no more than 5.

9. A method according to claim 8 in which the solution further contains 0.5 to 5M of $Cl^-$, $SO_4^=$ or $PO_4^{32}$.

10. A method according to claim 8 in which the cation is $Eu^{++}$ and the wavelength of solar radiation is <400 nm.

11. A method according to claim 1 in which the regenerant is a ruthenium pyridine or phenanthroline complex in a photoexcited state.

12. A method according to claim 11 further including the step of reacting a ruthenium (+3) ligand complex with water to form ruthenium (+2) ligand regenerant precursor and oxygen and further including the step of exposing the precursor to solar radiation at a wavelength greater than 450 mn to form photoexcited regenerant.

13. A method according to claim 1 in which the reagent is deposited on a support and further including the step of flowing a solution of regenerant over the supported spent reagent.

14. A method according to claim 1 in which the regenerant is deposited on a support and further including the step of flowing a solution of spent reagent in contact with the supported regenerant.

15. A method according to claim 1 in which both the reagent and regenerant are deposited on a support disposed in a reactor and further including the step of irradiating water in the reactor at pH $\leq$ 5 at a wavelength of 290 to 550 nm followed by a dark reaction of water at a pH of about 7.

* * * * *